Figure 1:
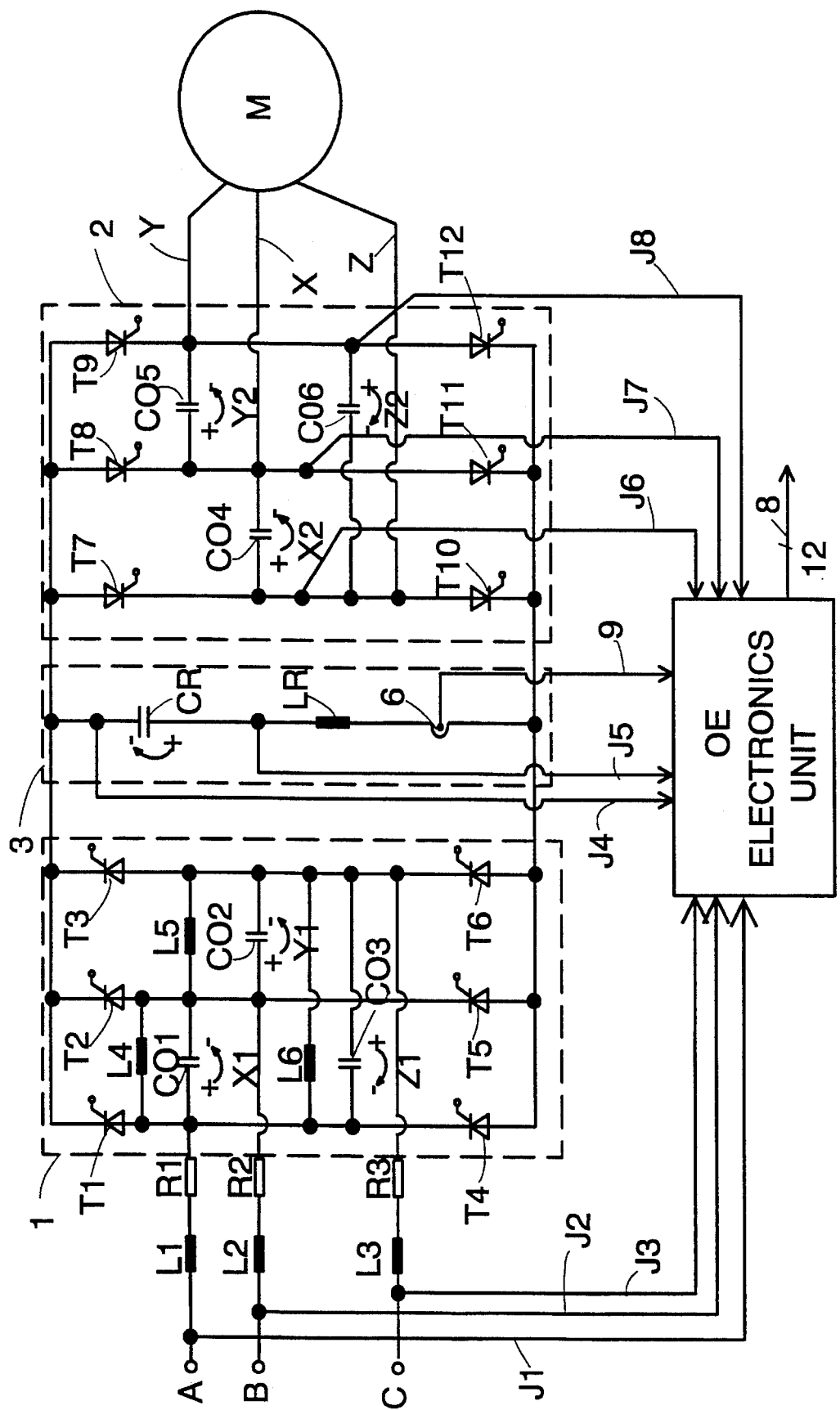

United States Patent [19]

Kähkipuro

[11] Patent Number: 5,523,937
[45] Date of Patent: Jun. 4, 1996

[54] FREQUENCY CONVERTER, PROCEDURE FOR CONTROLLING IT AND MOTOR CONTROL USING A FREQUENCY CONVERTER

[75] Inventor: Matti Kähkipuro, Hyvinkää, Finland

[73] Assignee: Kone Oy, Helsinki, Finland

[21] Appl. No.: 165,842

[22] Filed: Dec. 14, 1993

[30] Foreign Application Priority Data

Dec. 22, 1992 [FI] Finland .................................... 925838

[51] Int. Cl.⁶ .................................................. H02M 5/45
[52] U.S. Cl. .............................................. 363/37; 363/136
[58] Field of Search ............................ 363/37, 127, 132, 363/136, 137, 35, 51

[56] References Cited

U.S. PATENT DOCUMENTS

| | | | |
|---|---|---|---|
| 4,096,557 | 6/1978 | Schwarz | 363/9 |
| 4,730,242 | 3/1988 | Divan | 363/37 |
| 4,942,511 | 7/1990 | Lipo et al. | 363/136 |
| 5,010,471 | 4/1991 | Klaassens et al. | 363/160 |

OTHER PUBLICATIONS

Kim and Cho, "New Bilateral Zero Voltage Switching AC/AC Converter Using High Frequency Partial-Resonant Link", Pub. "IECON '90", vol. II, Nov. 27–30, 1990, pp. 857–862.

Rim and Cho, "Quantum Transformation: The Analysis of Quantum Rectifier–Inverters", Pub. 1989 IEEE Industry Applications Society Annual Meeting, Part I, Oct. 1–5, 1989, pp. 1081–1085.

*Primary Examiner*—Peter S. Wong
*Assistant Examiner*—Y. Jessica Han

[57] ABSTRACT

A procedure and an apparatus for converting a first alternating voltage into a second alternating voltage with respect to frequency and amplitude by means of first (1) and second (2) bridges having switches ($T_1 \ldots T_{12}$), and a resonant circuit (3) connected between the bridges. The invention also relates to the use of a frequency converter for the control of a motor. The voltages of a supplying network and the voltages of a load (M) are connected across the resonant circuit (3) in an alternating fashion by means of bridge switches ($T_1 \ldots T_6$) and bridge switches ($T_7 \ldots T_{12}$), respectively. The voltages are alternately connected across the resonant circuit for a period equal to respective half cycles of the characteristic frequency of the resulting resonant circuit formed. When power is supplied, a bridge change is effected after each period.

17 Claims, 13 Drawing Sheets

FREQUENCY CONVERTER, PROCEDURE FOR CONTROLLING IT AND MOTOR CONTROL USING A FREQUENCY CONVERTER

The present invention relates to a procedure for controlling a soft-switched inverter and to a frequency converter. In addition, the invention relates to the use of a frequency converter for controlling a motor.

To produce a varying frequency and voltage from a fixed supply network, various frequency converters have been used. There are converters which convert an alternating voltage directly into another alternating voltage, and converters which first rectify an alternating voltage and then invert the direct voltage. To reduce the switching losses, soft-switching converters have been developed in which the aim is to turn the main-circuit switches on and off in a dead condition. The solutions developed have often led to complicated circuits and control systems difficult to implement.

The object of the present invention is to develop a new frequency converter applying the soft-switching principle, as well as a procedure for controlling it, which is simple and can be easily implemented using cheap switching components. The frequency converter may be used to control a motor.

The invention makes it possible to achieve a construction that practically produces no radio interference at all as it has a resonant circuit limiting the highest frequency that may appear in it. The circuit is able to supply power into the network without separate auxiliary components, only the criteria governing the control are changed according to the situation. The current taken from the network and the current supplied into it are almost sinusoidal.

The invention substantially obviates switching losses because turn-on and turn-off occur when no current is flowing. Cheap semiconductors can be used in the solution; thyristors will do just as well as transistors and IGBTs. Due to the absence of switching losses, efficiency is high.

The resonant circuit is able to raise the output voltage to a level higher than that of the input voltage. Therefore, when the switching system of the invention is used, a good tolerance for supply network undervoltage is achieved and also other variations of the supply voltage can be easily eliminated. Moreover, the operating voltage of the motor can be higher than the supply voltage. The output voltage curve form is much more advantageous than in the case of pulse width modulation and does not contain high harmonics, thus avoiding acoustic noise.

With the procedure of the invention, galvanic isolation is achieved between the supplying network and the load circuit.

Figure 2:
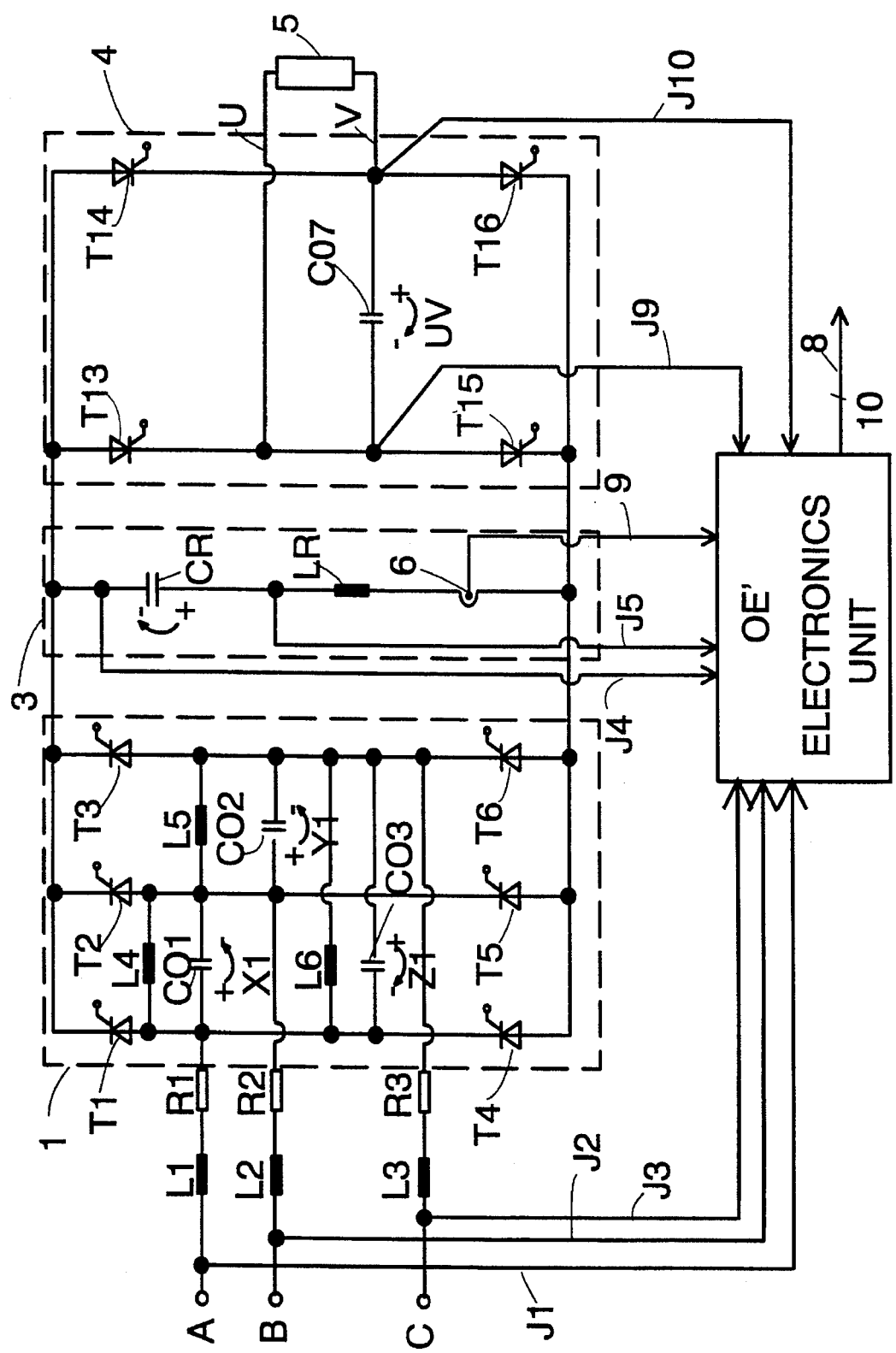
Figure 3A:
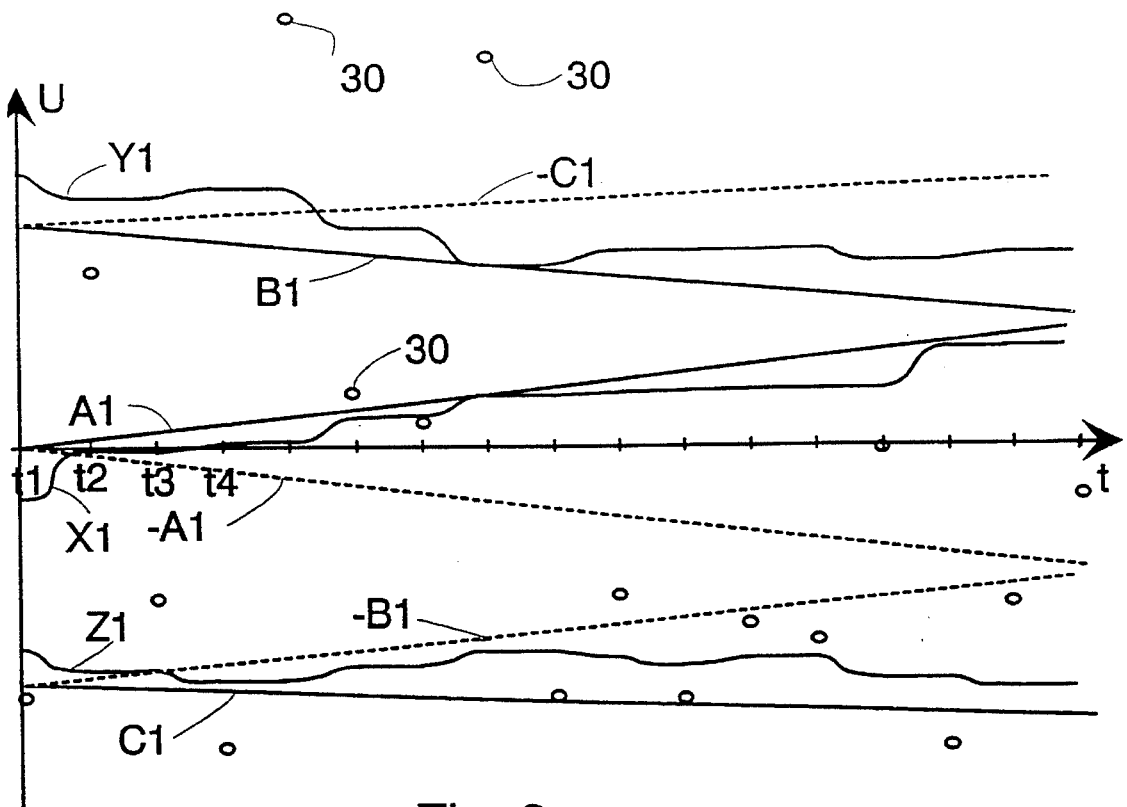
Figure 3B:
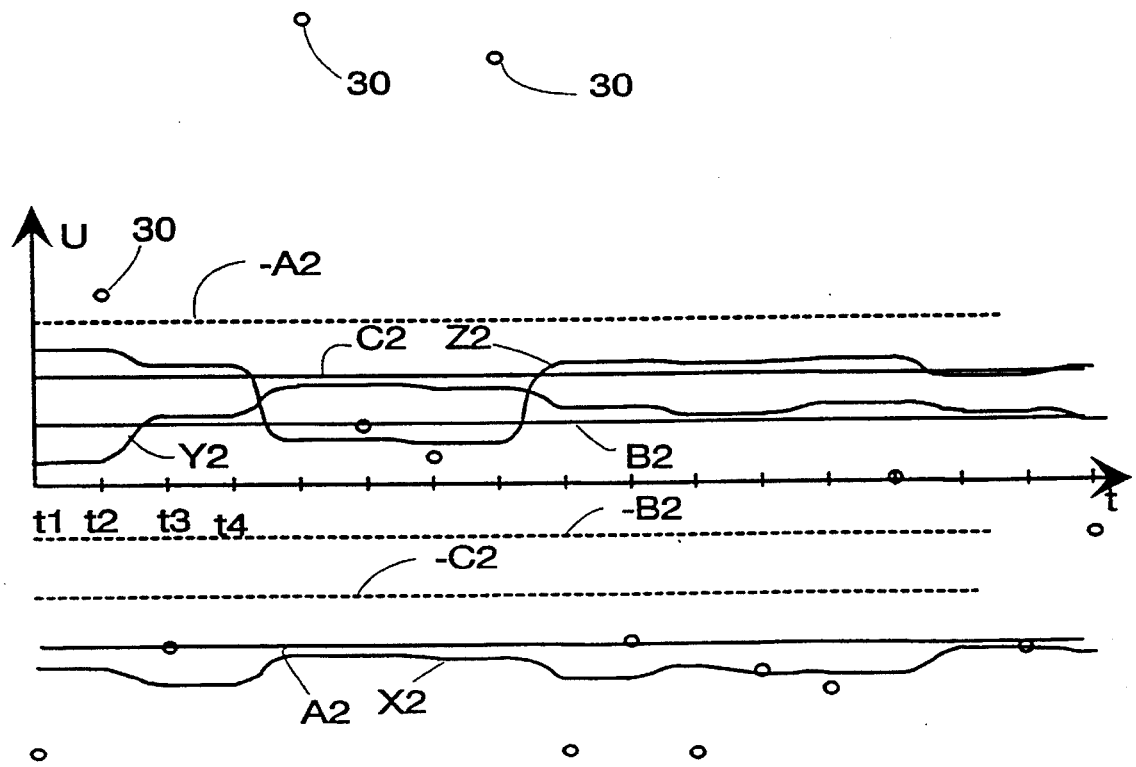
Figure 4A:
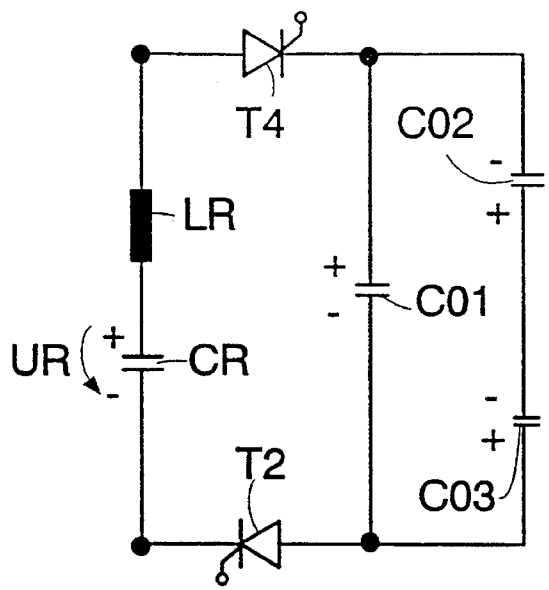
Figure 4B:
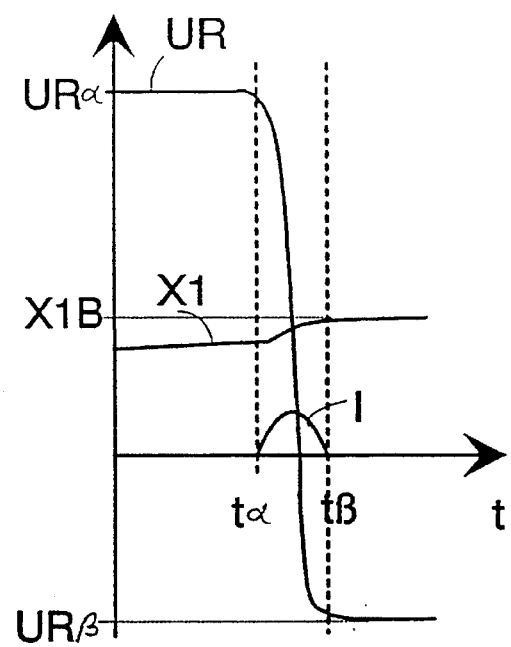
Figure 5A:
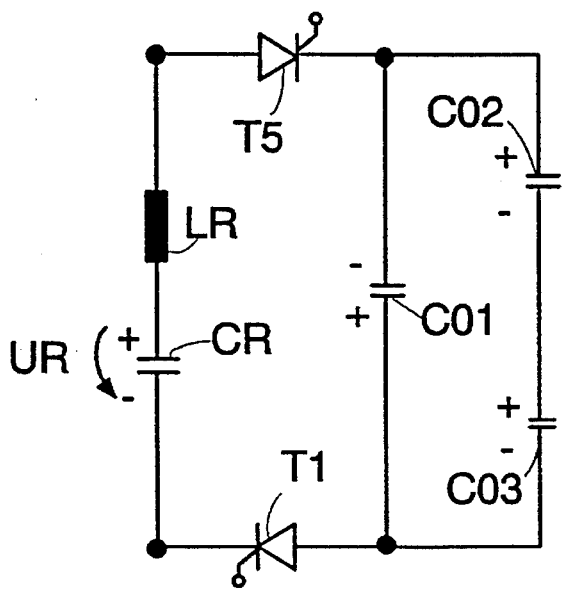
Figure 5B:
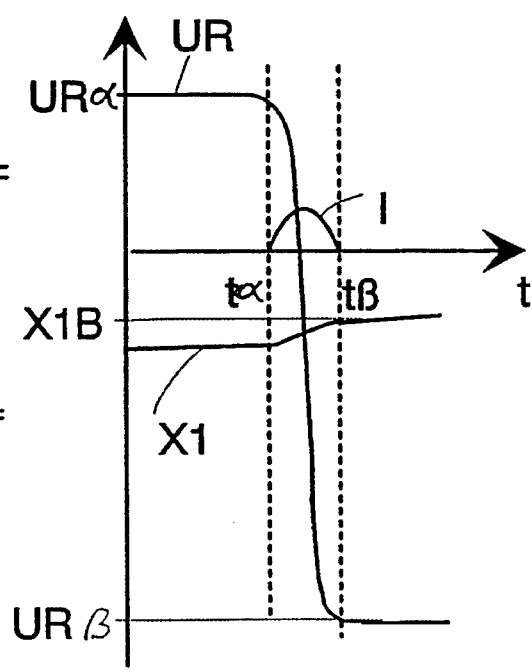
Figure 6:
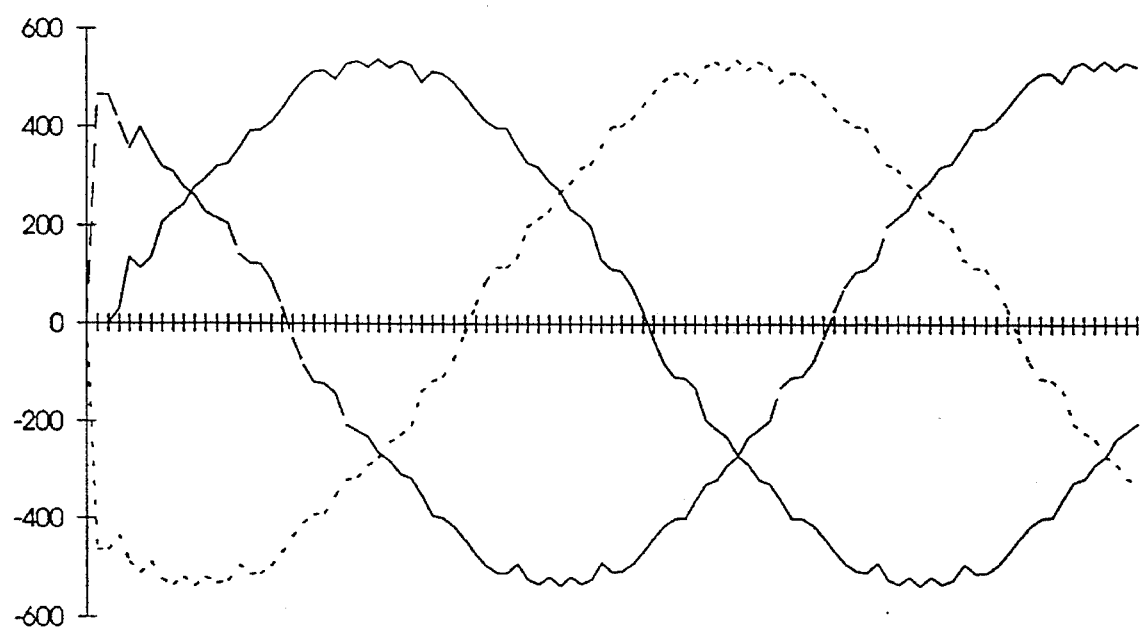
Figure 7:
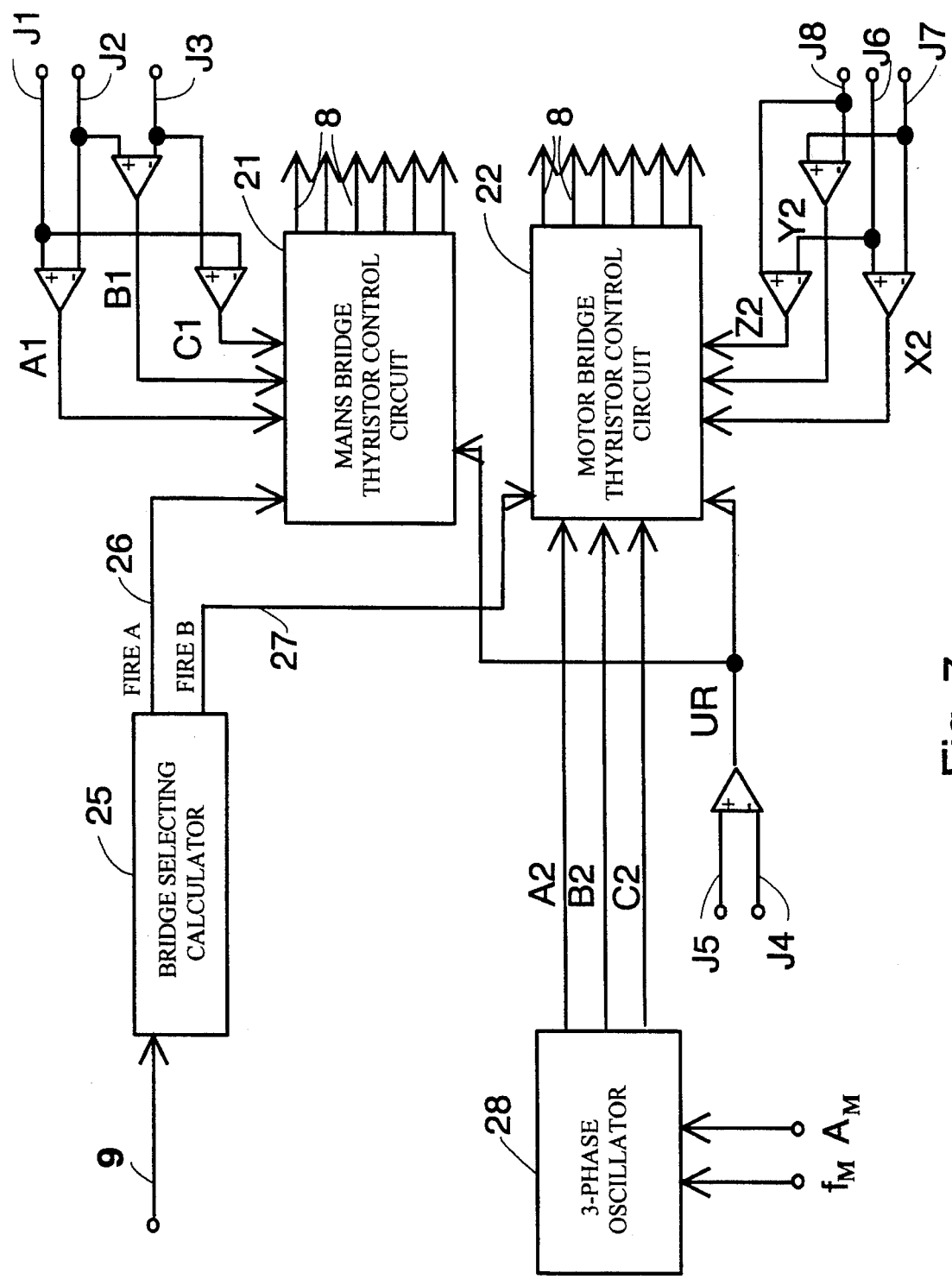
Figure 8A:
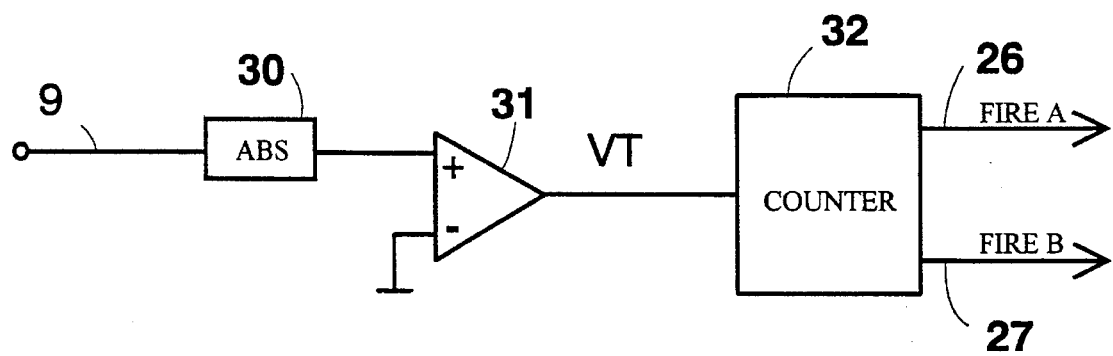
Figure 8B:
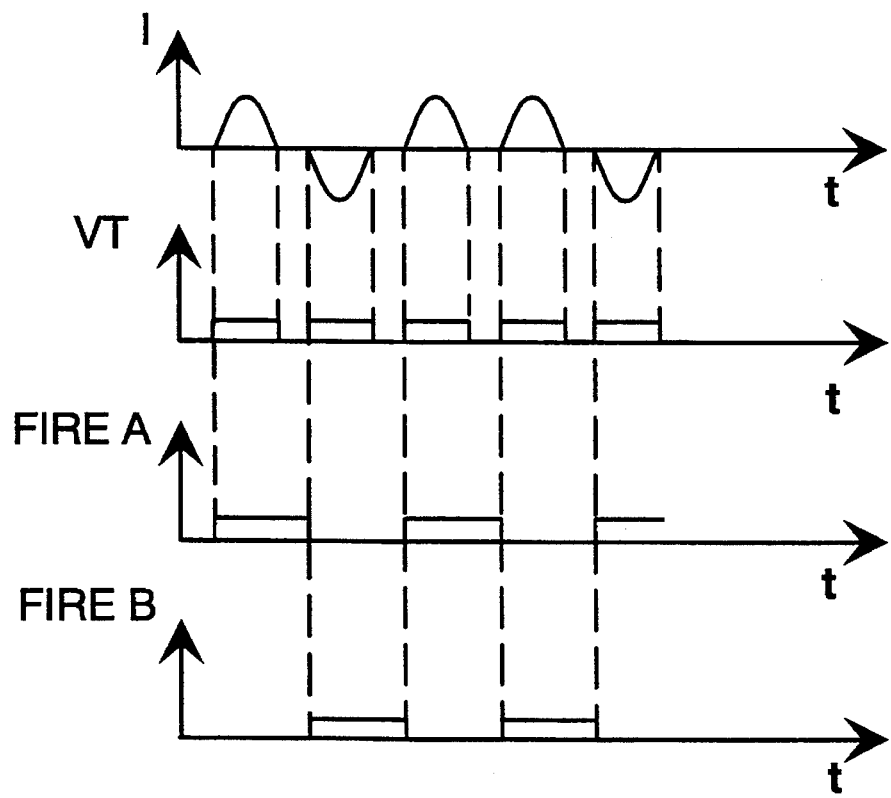
Figure 9:
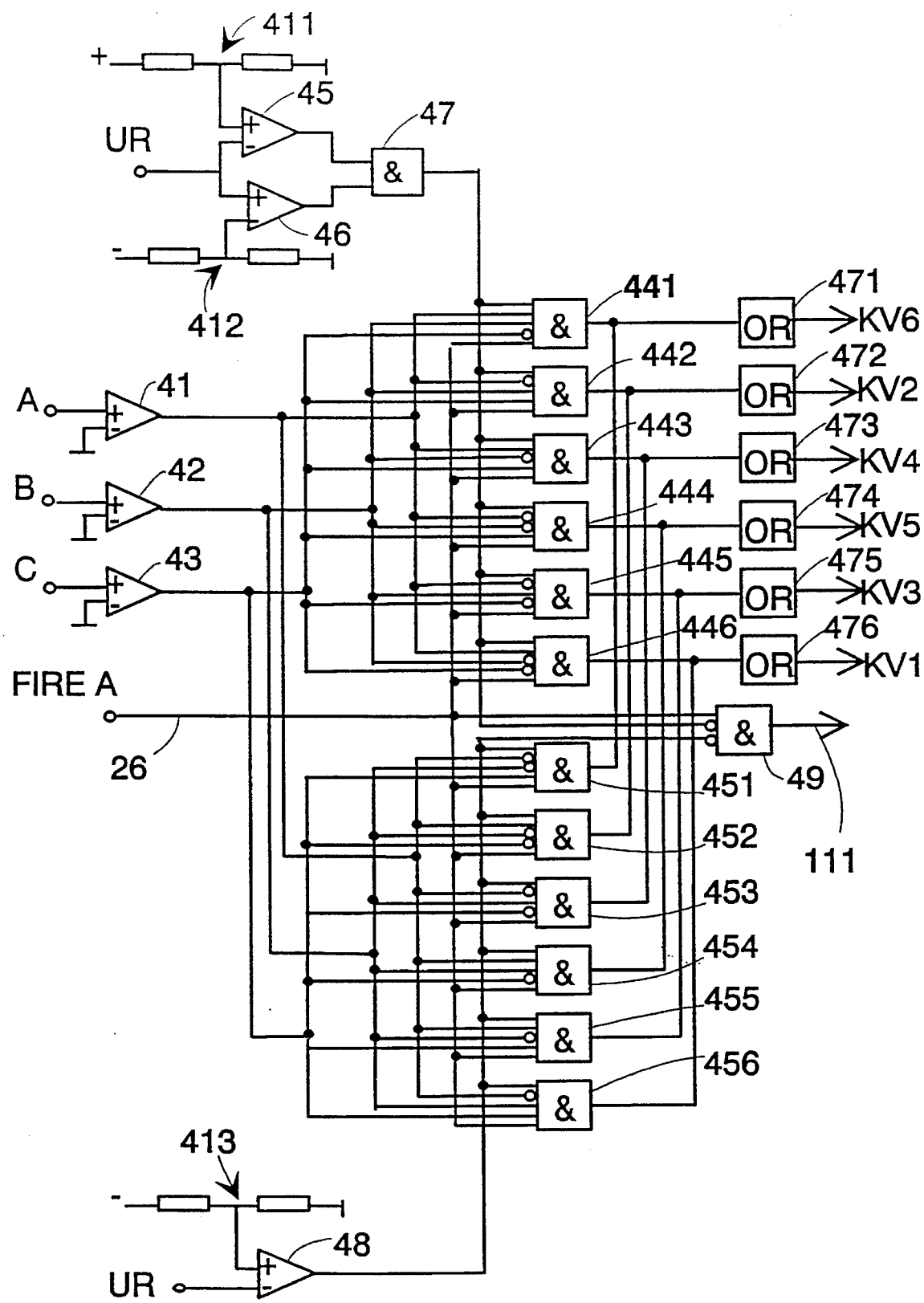
Figure 10:
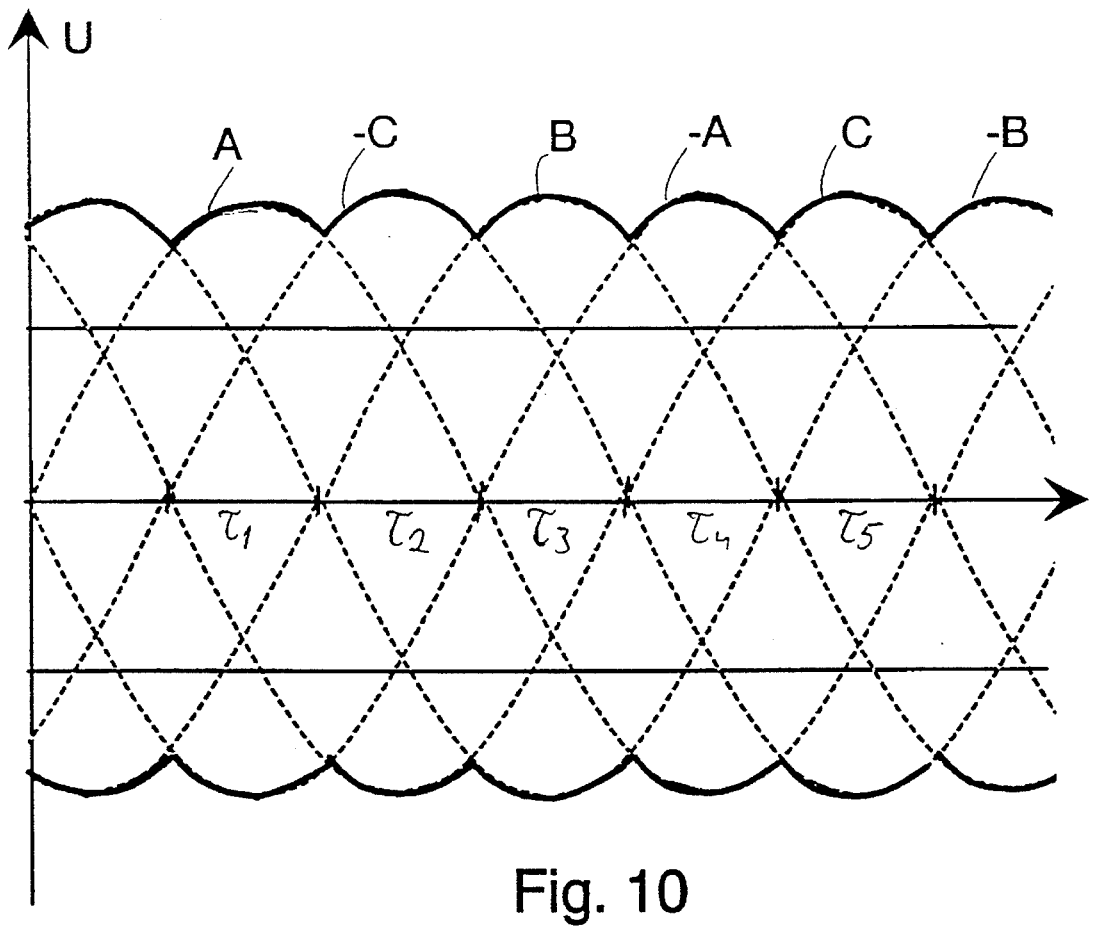
Figure 14:
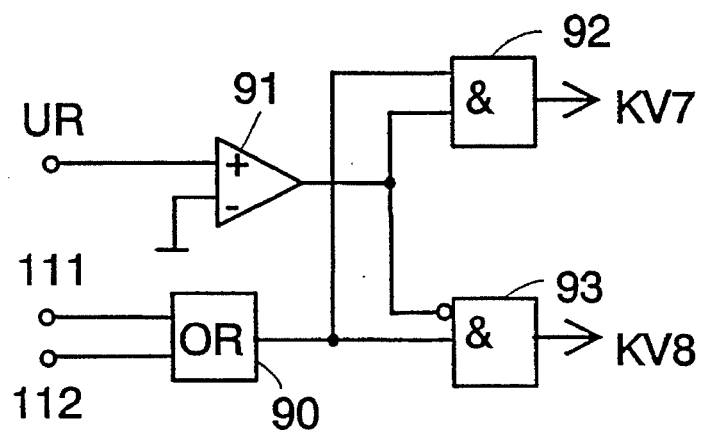
Figure 11:
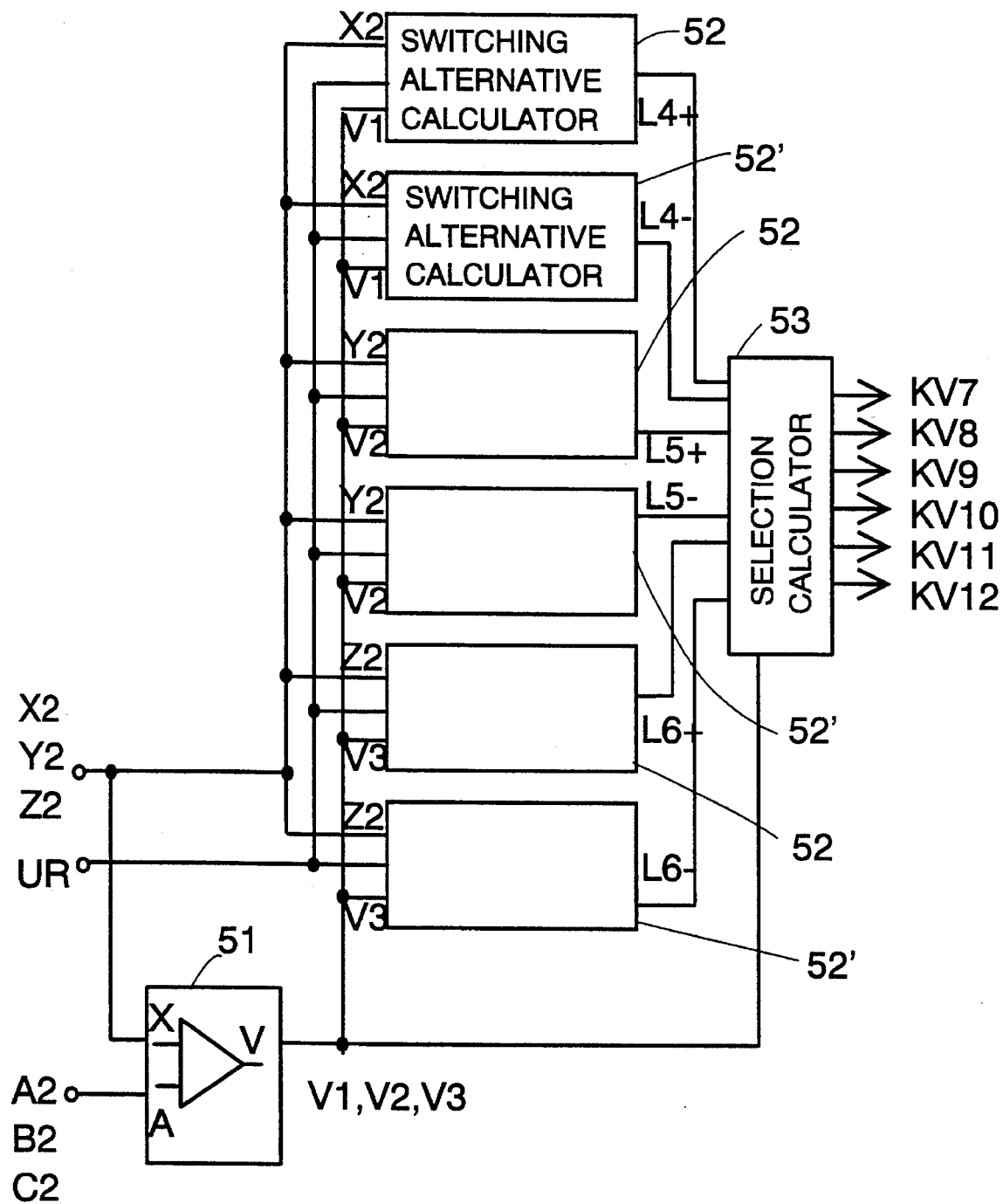
Figure 12A:
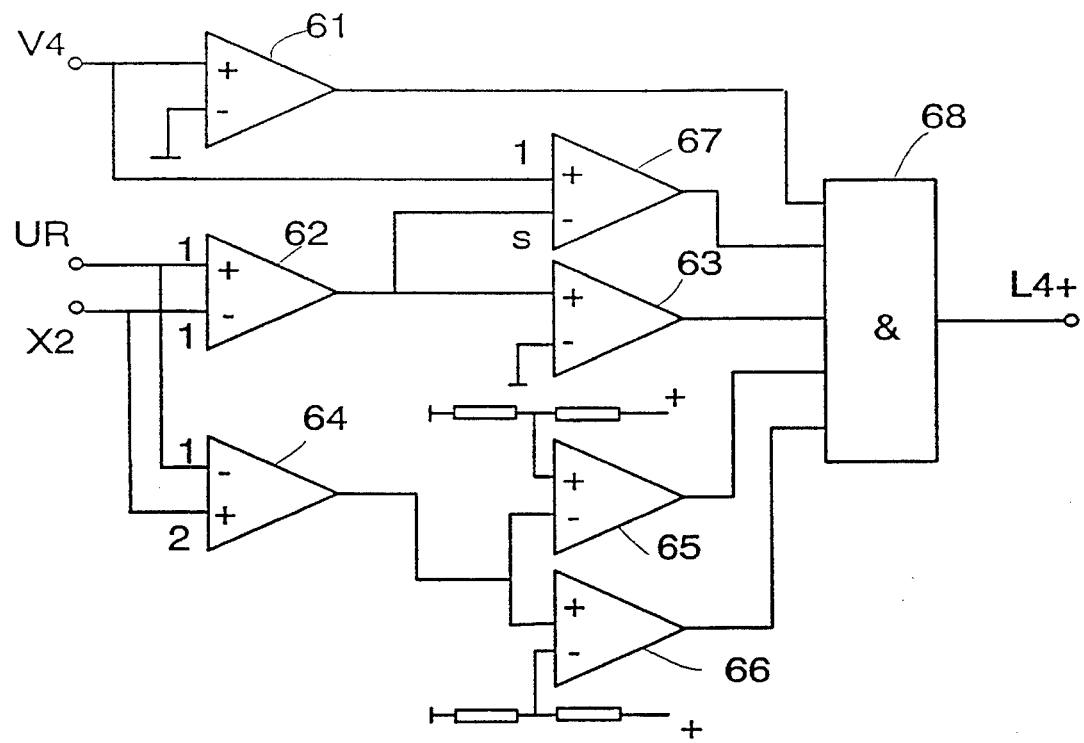
Figure 12B:
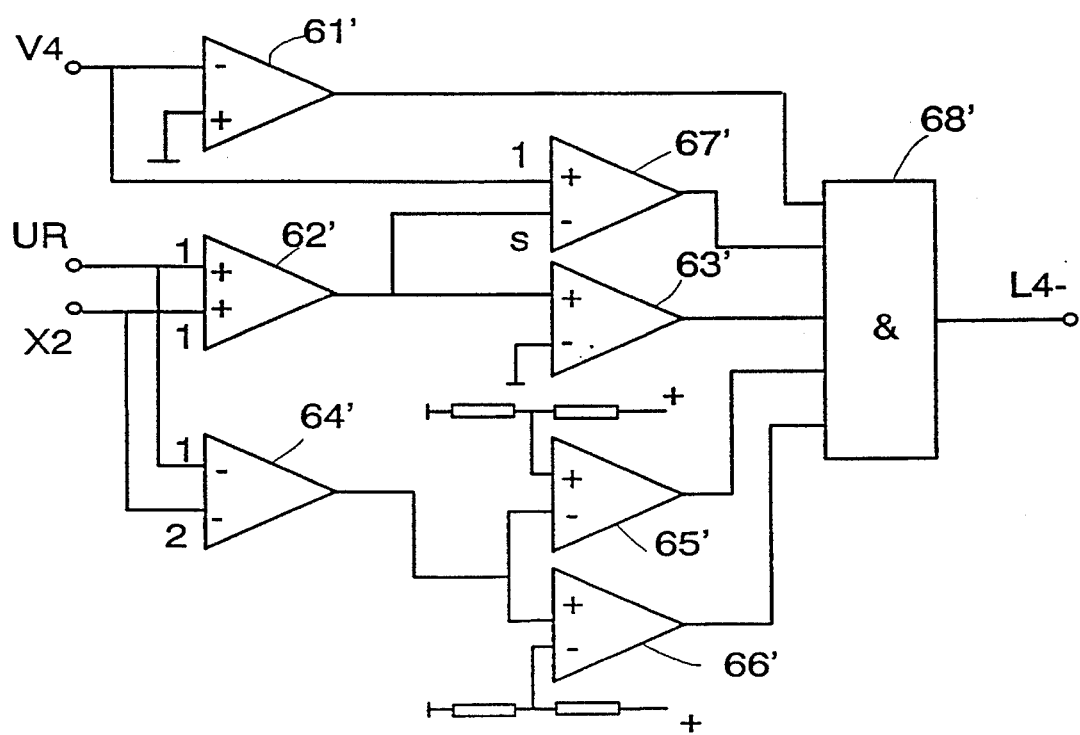
Figure 13:
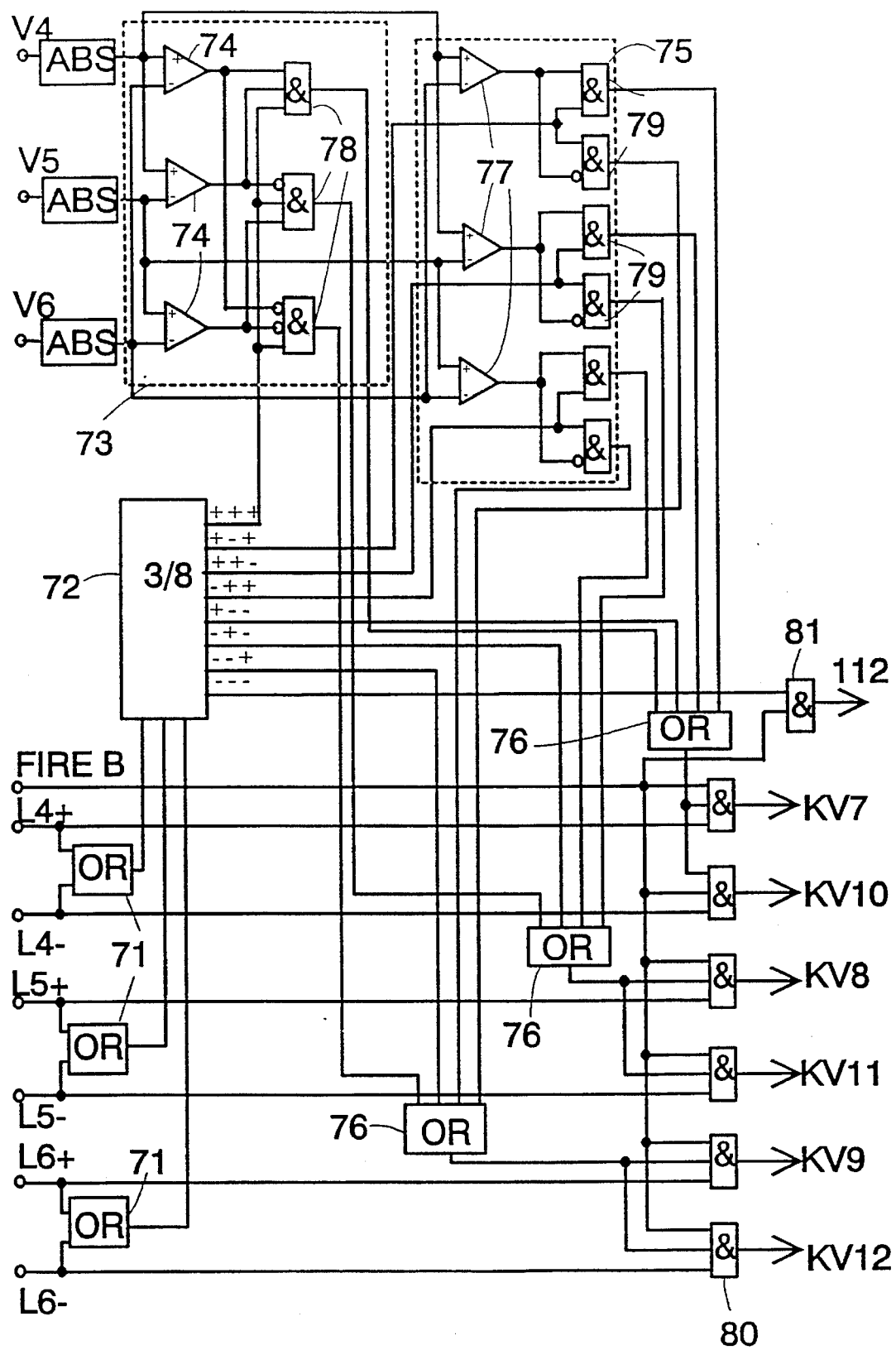
Figure 15:
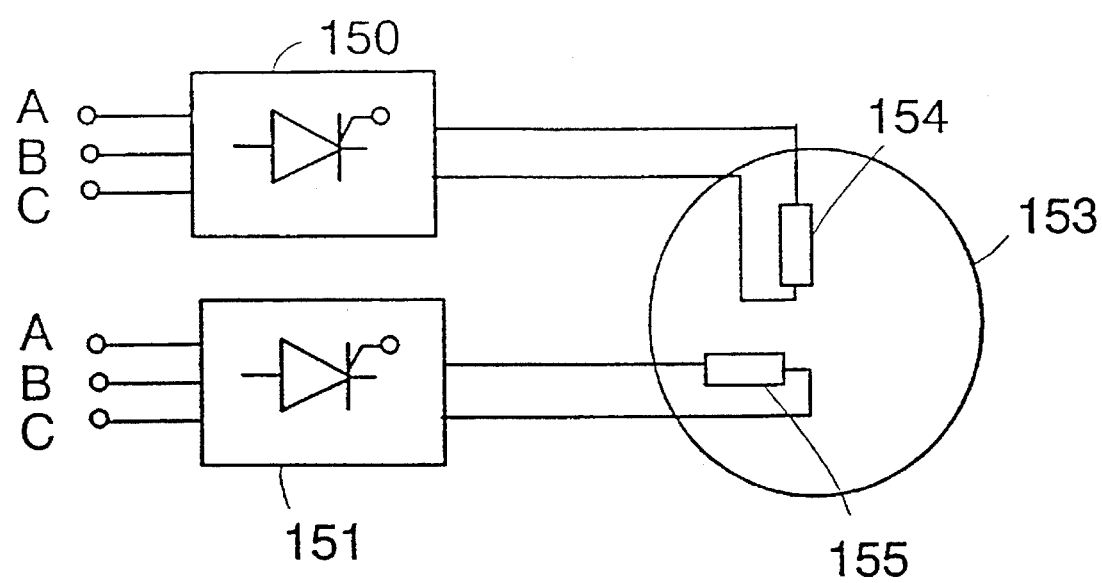

In the following, the invention is described in detail with the aid of one of its embodiments by referring to the drawings, in which FIG. 1 presents a frequency converter according to the invention, FIG. 2 presents another frequency converter according to the invention, FIGS. 3a and 3b present momentary variations of the input and output voltages, FIGS. 4a and 4b present a switching situation in the procedure, FIGS. 5a and 5b present another switching situation in the procedure, FIG. 6 presents the mains bridge voltage, FIG. 7 presents a block diagram of the frequency converter control FIGS. 8a and 8b illustrate a bridge selecting calculator with corresponding signal waveforms, FIG. 9 presents a mains bridge controller, FIG. 10 presents the network voltages, FIG. 11 presents a motor bridge controller, FIGS. 12a and 12b illustrate a switching alternative calculator for the motor bridge, FIG. 13 presents an error selection calculator, FIG. 14 presents a polarity reversing logic, and FIG. 15 presents a circuit for controlling a two-phase motor as provided by the invention.

FIG. 1 shows the main circuit of the invention for a three-phase system, and the associated electronics. The inverter consists of twelve thyristors $T_1 \ldots T_{12}$, which are arranged in two bridges. Thyristors $T_1 \ldots T_6$ form the mains bridge 1 and thyristors $T_7 \ldots T_{12}$ the motor bridge 2. Between the bridges is a resonator 3 consisting of a capacitor $C_R$ and an inductance $L_R$. Connected between the phases A, B and C in the mains bridge 1 are capacitors $C_{01}$, $C_{02}$ and $C_{03}$ and, in parallel with them, inductances $L_4$, $L_5$ and $L_6$. The mains bridge phase conductors are provided with series inductances $L_1$, $L_2$ and $L_3$ and series resistors $R_1$, $R_2$ and $R_3$. The series inductances are not essential to the procedure and apparatus of the invention. The motor bridge feeds a motor M via phase conductors X, Y and Z. Connected between the phases are capacitors $C_{04}$, $C_{05}$ and $C_{06}$.

The thyristors of the inverter are controlled by an electronics unit OE, to which the reference and actual values of the required quantities are input. The mains bridge main voltages are measured via measuring conductors $J_1$, $J_2$ and $J_3$. The main voltages across the capacitors $C_{04} \ldots C_{06}$ connected between the phases of the motor bridge are measured by voltage measuring circuits $J_6$, $J_7$ and $J_8$. The voltage across the capacitor $C_R$ in the resonant circuit 3 is measured by voltage measuring circuits $J_4$ and $J_5$. The current of the resonant circuit is measured by a current transformer 6, and the measurement data is passed via conductor 9 to the control electronics OE. The thyristor firing pulses, which are applied via conductors 8 to the control electrodes of the thyristors $T_1 \ldots T_{12}$, are generated by the control electronics as described later on.

FIG. 2 presents another alternating-voltage converter, using the same reference numbers as in FIG. 1 to denote corresponding components. Through the phase conductors A, B and C, the supply voltage is connected to the mains bridge 1 via series inductances $L_1$, $L_2$ and $L_3$ and series resistors $R_1$, $R_2$ and $R_3$. The mains bridge and the resonant circuit 3 are in accordance with the mains bridge and resonant circuit of FIG. 1. The load bridge 4 is implemented using a one-phase design and consists of thyristors $T_{13} \ldots T_{16}$, connected between the resonant circuit terminals and the load bridge output conductors U and V. Connected between conductors U and V are a capacitor $C_{07}$ and the load 5 to be fed. The voltages in the load bridge output conductors U and V are measured by means of voltage measuring conductors $J_9$ and $J_{10}$. Other measurements are implemented in accordance with the corresponding measurements in FIG. 1. Similarly, the control electronics OE' generate the thyristor control pulses, which are applied to the control electrodes of thyristors $T_9 \ldots T_6$, and $T_{13} \ldots T_{16}$ via conductors 8.

FIG. 3a depicts the changes in the mains bridge voltages and FIG. 3b the changes in the motor bridge voltages at different instants of time when the thyristors are controlled by the method of the invention. In FIGS. 3a and 3b, the lines indicate the supply network main voltages A1, B1 and C1 as well as the reference voltages A2, B2 and C2 for the motor bridge main voltages. The countervalues −A1, −B1, −C1, −A2, −B2 and −C2 of the main voltages are indicated in a corresponding manner. The circles 30 represent the charging voltage of capacitor $C_R$ at different instants of time. The solid lines in FIG. 3a represent the actual values X1, Y1 and Z1 of the voltages across the capacitors connected between the phases in the mains bridge. The solid lines in FIG. 3b represent the actual values X2, Y2 and Z2 of the motor bridge main voltages. According to the invention, a mains bridge or motor bridge main voltage is connected in parallel with the resonant circuit 3 by means of two mains bridge or two motor bridge switches for a period equal to half the cycle of the characteristic frequency of the circuit thus formed. In this way, circuits like those in FIG. 4 and 5 are formed, in which the main voltages and the resonant circuit voltage change in a certain manner.

Let us consider the action starting from instant $t_1$ as indicated in the figures. According to selection criteria to be described later on, switches $T_2$ and $T_4$ are selected. At instant $t_2$, the first current impulse from the resonator has gone and voltage X1 has undergone a correction in the positive direction. Simultaneously, voltages Y1 and Z1 have swung in the negative direction. After this, the electronics have selected motor bridge switches $T_8$ and $T_{12}$ and, as a consequence, at instant t3, Y2 has reached a new value and, correspondingly, voltages X2 and Z2 have swung a little. The action continues in this manner, striving to change one voltage at a time, generally the one that deviates most from the reference. The other voltages change in a manner determined by the component ratings and voltages in the circuit. The sequence in which the switches to be turned on are selected is determined on the basis of the voltage differences between the actual and reference voltages, the operating limits set for the control action, and the direction of power flow, among other things. For example, in situations where it is not possible to correct the voltage of the bridge selected, or when a bypass for reactive power is to be provided, the thyristors connected to the same phase branch, e.g. $T_1$ and $T_4$, are selected, with the result that the charge of the resonant circuit capacitor UR changes sign but the bridge voltages are not corrected.

FIG. 4a shows a resonant circuit configuration occurring in the invention when the absolute value of main voltage X1 is corrected in the positive direction. Thyristors $T_2$ and $T_4$ are turned on, and in this situation capacitor $C_{01}$ is connected in series with the resonant circuit 3. Capacitor $C_{01}$ has a charging voltage X1 and in parallel with it capacitors $C_{02}$ and $C_{03}$ in series. As illustrated by FIG. 4, the voltage $UR\alpha$ prevailing across capacitor $C_R$ at the instant of turn-on $t_\alpha$ swings across the main voltage X1 to value $UR\beta$ at instant $t_\beta$. In this situation, a current I is flowing in the resonant circuit. By selecting component values $C_R \ll C_{01} = C_{02} = C_{03}$, the following approximative equations for the resonant circuit are obtained:

$$UR\beta = -UR\alpha + 2*X1 \qquad (1)$$

$$X1B = X1 + 2*(UR\alpha - X1) * \frac{CR}{1.5*C01} \qquad (2)$$

$$Y1B = Y1 - (UR\alpha - X1) * \frac{CR}{1.5*C01} \qquad (3)$$

$$Z1B = Z1 - (UR\alpha - X1) * \frac{CR}{1.5*C01} \qquad (4)$$

In a corresponding manner, FIG. 5a. illustrates the action of the resonant circuit in a situation where the absolute value of main voltage X1 is caused to change in the negative direction. In this case, thyristors $T_1$ and $T_5$ are turned on. The voltage UR of the resonant circuit capacitor now swings from the value $UR\alpha$ across the main voltage X1 to the value $UR\beta$ as shown in FIG. 5b. In this case, the following equations apply:

$$UR\beta = -UR\alpha - 2*X1 \qquad (1')$$

$$X1B = X1 - 2*(UR\alpha + X1) * \frac{CR}{1.5*C01} \qquad (2')$$

$$Y1B = Y1 - (UR\alpha + X1) * \frac{CR}{1.5*C01} \qquad (3')$$

$$Z1B = Z1 - (UR\beta + X1) * \frac{CR}{1.5*C01} \qquad (4')$$

In a corresponding manner, other thyristor pairs are turned on according to alternatives and selection criteria described in detail below. FIG. 6 presents the mains bridge main voltages in a situation where no load is connected to the frequency converter. In the above examples, the switching frequency is 10 kHz and the supply frequency 50 Hz.

FIG. 7 is a block diagram representing the control electronics according to the invention for the apparatus of FIG. 1. The main circuit thyristors are controlled by a mains bridge thyristor control circuit 21 and a motor bridge thyristor control circuit 22, said control circuits having outputs 8 connected to the control electrodes of thyristors $T_1 \ldots T_{12}$. These two control circuits are controlled by control pulses FIRE A and FIRE B, which are passed via conductors 26 and 27 to control circuits 21 and 22, respectively. A bridge selecting calculator selects the bridge in the manner illustrated by FIG. 8 using the measurement signal of the current transformer 6, which is passed via conductor 9 to the bridge selecting calculator 25. Control circuit 21 receives at its inputs the actual values A1, B1 and C1 of the network main voltages, which are determined with the aid of measurement data $J_1 \ldots J_3$, as well as the resonance capacitor voltage UR determined from measurement data $J_4$ and $J_5$.

Control circuit 22 receives the main voltage actual values X2, Y2 and Z2 formed from the motor bridge voltage measurements $J_6 \ldots J_8$ as well as the resonance capacitor voltage data UR. The motor bridge voltage references A2, B2 and C2 are generated by a three-phase oscillator 28 for motor bridge voltage references. The oscillator 28 receives at its inputs the frequency reference $f_M$ and and the amplitude reference $A_M$ for the motor voltage. The thyristors of the motor bridge and those of the mains bridge are so controlled that two thyristors in one bridge are conducting at a time. During each conduction period, the charging voltage of the resonance capacitor swings across the actual value of the main voltage being corrected during the conduction period in question, and a bridge change occurs after each conduction period. The control action will be described in greater detail later on.

FIG. 8a illustrates the action of the bridge selecting calculator. From the resonant circuit current I received from the current transformer via conductor 9, circuit 30 determines an absolute value, from which comparator 31 forms a current data pulse VT. The current data pulse is fed into a counter 32 which changes its output upon the arrival of each new current pulse. The control pulses FIRE A and FIRE B obtained at the outputs 26 and 27 of the counter 32 are used to determine the bridge to be controlled at each instant, either the mains bridge 1 or the motor bridge 2. The pulse shapes of the current I, the current data VT and the control pulses FIRE A and FIRE B obtained from the output conductors of the bridge selecting calculator are shown in FIG. 8b.

FIG. 9 illustrates the structure of the circuit 21 controlling the mains bridge thyristors. The supply voltages A, B and C are applied to the inputs of comparators 41 . . . 43, whose outputs are connected to AND elements 441 . . . 446 and to AND elements 451 ... 456. During rectification, to exclude superfluous small corrections, a test is performed by means of comparators 45 and 46 and AND element 47 to ensure that the resonance capacitor voltage is of a suitable value. A maximum limit for UR could be e.g. 300 V when the network main voltage is 380 V. The voltage limits are implemented by using voltage division circuits 411 and 412 consisting of resistors and by means of the voltage sources (±). The output of AND element 47 is passed into AND elements 441 ... 446, and the outputs of these are passed into OR elements 471 ... 476. Some of the inputs of AND elements 441 ... 446 are negating inputs, denoted by an o.

FIG. 10 illustrates the supply voltages according to which the switches to be controlled are selected. During the period $\tau_1$, the voltage of phase A is positive while the voltages of phases B and C are negative, in which case all the AND element 226 inputs obtained from comparators 41 ... 43 are true. If the control pulse FIRE A obtained via conductor 26 is positive and the capacitor voltage UR is within the set limits, the output of AND element 446 is a logical 1 and OR element 476 produces switching alternative 1 (KV1), causing thyristors $T_1$ and $T_5$ to be turned on. The rest of the switching alternatives KV2 ... KV5 are realized in a corresponding manner.

In an inversion situation, the selection is made by means of AND elements 451 ... 456, which, as above, contain negating inputs, with a resonance capacitor value determined by comparator 48. Voltage divider 413 determines the allowed voltage values. When the resonance capacitor voltage is sufficiently negative (e.g. −800 V), thyristors $T_1$ and $T_5$ will be turned on during period $\tau_4$ when the A-phase voltage is negative and the B- and C-phase voltages are positive. The various switching alternatives and the thyristors to be turned on in each alternative in rectification and inversion situations are presented in table 1.

TABLE 1

| SWITCHING ALTERNATIVE | THYRISTORS | CONTROLLED |
|---|---|---|
| KV1 | T1 | T5 |
| KV2 | T2 | T4 |
| KV3 | T2 | T6 |
| KV4 | T3 | T5 |
| KV5 | T5 | T4 |
| KV6 | T1 | T6 |

When the resonance capacitor voltage is outside the set limits, i.e. |UR|>300 V and UR>−800 V in the example described, a reversal of polarity is performed. For this, the output 111 of AND element 49 is connected to the input of a polarity reversing circuit, depicted in FIG. 14.

FIG. 11 shows a block diagram of the control circuit 22 controlling the motor bridge thyristors. The input quantities are the motor bridge reference voltages A2, B2 and C2 obtained from the three-phase oscillator 28 and the actual values of the motor bridge main voltages X2, Y2 and Z2, as well as the actual value UR of the resonance capacitor voltage. An error calculator 51 computes the difference V1 ... V3 between the reference and actual values of each main voltage. For each switching alternative in the motor bridge, there is a separate switching alternative calculator 52 or 52' which in a manner to be described later on in connection with FIG. 12a and 12b, determine the switching alternatives L4+, L4−, L5+, L5−, L6+and L6− possible in each situation. A selection calculator 53 determines which one of the possible switching alternatives will correct the largest error in a circuit according to FIG. 13. At the output of this calculator 53, control data corresponding to switching alternatives KV7 ... KV12 can be selected. With different switching alternatives, the motor bridge thyristors are turned on according to Table 2.

TABLE 2

| SWITCHING ALTERNATIVE | THYRISTORS | CONTROLLED |
|---|---|---|
| KV7 | T7 | T11 |
| KV8 | T8 | T12 |
| KV9 | T9 | T10 |
| KV10 | T8 | T10 |
| KV11 | T9 | T11 |
| KV12 | T7 | T12 |

FIG. 12a and 12b show the block diagrams of two switching alternative calculators 52 and 52' for testing the possibility of controlling the thyristors in the X-phase supplying the motor. The input quantities are the actual value X2 of the motor bridge main voltage, the resonance capacitor voltage UR and the difference V1 between the actual and reference values for the phase concerned, said difference being obtained from the error calculator 51 shown in FIG. 11. In the switching alternative calculator, the various switching alternatives are considered to see which ones are possible according to the following criteria: whether the voltage error to be corrected is of the right sign, whether the current path considered is possible, whether the voltage change caused by the resonance oscillation is of a suitable magnitude, and whether the voltage will remain within the set voltage limits. Comparator 61 checks whether the voltage error to be corrected is of the right sign for the alternative in question. Operator 62 and comparator 63 probe the direction of the voltage across the thyristors to be turned on, i.e. they find out whether the current path considered is possible. By means of operator 64 and comparators 65 and 66, the magnitude of the voltage change to be produced is examined and compared to the set maximum limit of the voltage. Comparator 67 takes care that the voltage change produced is not too large, i.e. that it will not produce a larger error in the other direction. At the inputs of comparators 62, 64 and 67, the figure shows coefficients 1, 2 or s, according to which the input quantity is multiplied by 1, 2 or by the value s. The value of factor s is determined by the capacitor ratings and is obtained like the other coefficients from formulas 1–4 and, correspondingly, formulas 1'–4'. The outputs of comparators 61, 63, 65, 66 and 67 are fed into an AND element 68, whose output provides data indicating whether the switching alternative is possible or not at the current instant.

In a corresponding manner, the switching alternative calculator in FIG. 12b tests the suitability of the switching alternative when the direction of the resonance capacitor voltage is the same as that of the main voltage. The reference numbers with an apostrophe correspond to those without one in FIG. 12a, and each part functions in the same way as in FIG. 12a, only the signs of the quantities to be added have been changed where necessary. The switching alternative calculators 52 and 52' for the other phases are formed in a corresponding manner.

FIG. 13 depicts the logic circuit of the selection calculator 53. The calculator 53 receives at its inputs the switching alternative calculator outputs L4− ... L6+ and the voltage errors V1 ... V3. The OR circuits 71 determine the phase whose thyristors can be turned on. The outputs of the OR circuits are fed into a calculator 72, which provides the switching alternatives possible in the current situation.

When three alternatives are possible, a comparison is performed in logic circuit 73 by means of comparator elements 74 and AND elements 78 to see which one of the errors is largest and the corresponding alternative is selected. Similarly, when two alternatives are possible, the larger error is selected in logic circuit 75 by means of comparator elements 77 and AND elements 79. The outputs of calculator 72 allowing one phase as well as the outputs of logic circuits 73 and 75 are connected to the inputs of OR circuits 76, whose output signals indicate the phase whose voltage is to be corrected. The outputs of these OR circuits, together with the selection calculator ouputs L4 . . . L6 and the bridge selection control pulse FIRE B, are connected to the inputs of AND circuits 80, whose outputs indicate the switching alternative KV7 . . . KV12 selected. If none of the alternatives KV7 . . . KV12 is possible, AND element 81 will produce a pulse at its output 112 and the polarity of the capacitor is reversed by the logic presented in FIG. 14.

In the manner illustrated by FIG. 14, a thyristor pair for reversing the polarity of the capacitor is selected when other switching alternatives are not possible. Via conductors 111 and 112, OR circuit 90 receives signals indicating the need for a reversal of polarity, and, by means of comparator 91 and AND element 92, thyristors $T_3$ and $T_6$ are selected. The negating input of AND element 93 is fed by the output of comparator 91, and if the AND element output is true, thyristors $T_7$ and will be selected.

FIG. 15 shows how two frequency converters are connected to control the phases of a two-phase a.c. motor by means of one-phase frequency converters according to FIG. 2. The frequency converters 150 and 151 are constructed like the one in FIG. 2, and their control is implemented in accordance with the principles described above so as to produce a one-phase output of controlled frequency and amplitude. The two converters 150 and 151 are connected to the terminals of the two-phase motor 153 to feed phases 154 and 155 of the motor. For the control of the motor, the required actual and reference values for the voltages, frequency and speed are generated in a manner known in itself.

In the above, the invention has been described by the aid of examples of some of its embodiments. However, the presentation is not to be regarded as limiting the sphere of patent protection, but the embodiments of the invention may vary freely within the scope of the following claims.

I claim:

1. A method for converting a first alternating voltage into a second alternating voltage with respect to frequency and amplitude using a first bridge having a plurality of branches and a plurality of first switches, each branch having at least one first switch, a second bridge having a plurality of second switches, and a resonant circuit connected between the bridges, the method comprising the step of:

(a) connecting the first alternating voltage across the resonant circuit via at least two first switches of the first bridge for a first period substantially equal to half the cycle of the characteristic frequency of the resonant circuit formed, the at least two first switches being in different branches of the first bridge; and (b) connecting the resonant circuit across the second alternating voltage via at least two of the second switches of the second bridge for a second period substantially equal to half the cycle of the characteristic frequency of the resonant circuit formed.

2. The method according to claim 1, wherein a difference between an instantaneous actual value of the second alternating voltage and a reference value for the second alternating voltage determines which switches are selected as the second switches in said step (b).

3. The method according to claim 1, further including the step of:

(c) controlling an overvoltage condition of the first or second alternating voltages by determining in advance the values of the first or second alternating voltages produced when certain switches are used as the first or second switches, and inhibiting the selection of those certain switches when the determined values indicate that an overvoltage condition would result.

4. The method according to claim 1, wherein the second bridge includes a plurality of branches, each branch of the second bridge having at least one of the second switches, and wherein the at least two second switches switched in said step (b) different branches of the second bridge.

5. The method of claim 4, wherein said step (b) switches the at least two switches simultaneously.

6. The method according to claim 1, further including the step of:

(c) operating, in order to provide a bypass for reactive power, switches in the same branch of the first bridge.

7. The method of claim 1, wherein the first and second periods immediately follow each other.

8. The method of claim 1, wherein the first period and the second period are non-coincident.

9. The method of claim 1, wherein each branch of the first bridge is connected to a respective alternating source voltage having a respective phase.

10. A voltage signal frequency converter comprising:

a first bridge having a plurality of branches, each branch connected to a respective source voltage signal, and each branch having at least one switch;

a second bridge having at least one output conductor and including a plurality of switches connected to the at least one output conductor;

a resonant circuit; and controller means for alternately connecting said first bridge and said second bridge to said resonant circuit by controlling the switches of said first and second bridges, said control means closing at least two switches in different branches of the first bridge to thereby connect one of said respective source voltages across said resonant circuit for a first period substantially equal to half the cycle of the characteristic frequency of the resonant circuit, and closing at least two switches in the second bridge to thereby connect the resonant circuit to one of the at least one output conductor for a second period substantially equal to half the cycle of the characteristic frequency of the resonant circuit.

11. The frequency converter of claim 10, wherein said resonant circuit includes at least a capacitor and an inductor.

12. The frequency converter of claim 11, wherein said controller means further includes:

error calculator means for determining differences between actual output voltages on each of the at least one output conductors, and a reference value for a voltage desired to be output from the frequency converter; and an error selection calculator for determining, based on the differences calculated by said error calculator means and on a voltage across said capacitor, which switches to close in the second bridge.

13. The frequency converter of claim 10, wherein the first period and the second period are non-coincident.

14. The frequency converter of claim 10, wherein the first and second periods alternate immediately without time gaps.

15. The frequency converter of claim 10, wherein each respective source voltage is an alternating source voltage having a respective phase, and wherein a voltage signal on said at least one output conductor is an alternating output voltage signal.

16. The frequency converter of claim 15, wherein the alternating output voltage signal on said at least one output conductor has a phase, and wherein the number of respective source voltage phases differs from the number of alternating output voltage phases.

17. The frequency converter of claim 10, further comprising a motor connected to said at least one output conductor.

* * * * *